Aug. 19, 1924.

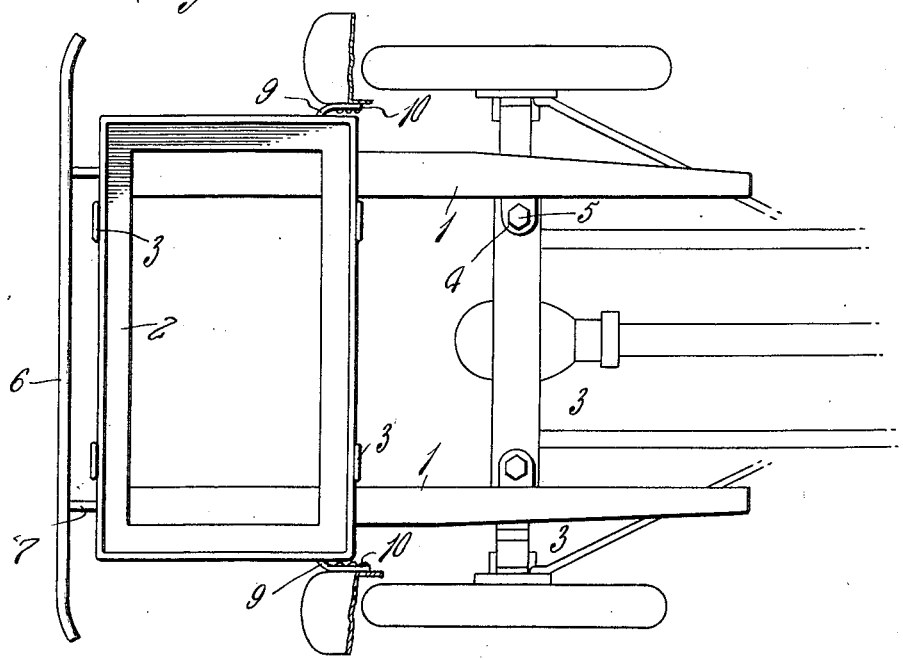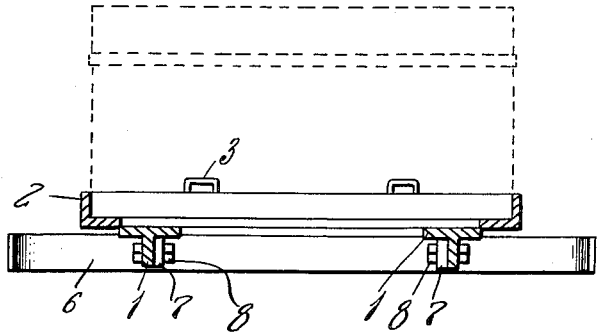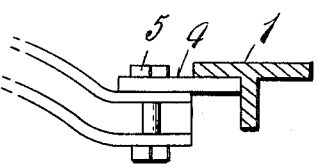

W. H. BRANSCUM

ATTACHMENT FOR MOTOR VEHICLES

Filed Jan. 28, 1924     2 Sheets-Sheet 2

1,505,854

W. H. Branscum
INVENTOR

BY *Victor J. Evans*
ATTORNEY

WITNESS:

Patented Aug. 19, 1924.

1,505,854

UNITED STATES PATENT OFFICE.

WILLIAM HERMON BRANSCUM, OF HIGHLAND, CALIFORNIA.

ATTACHMENT FOR MOTOR VEHICLES.

Application filed January 28, 1924. Serial No. 689,134.

*To all whom it may concern:*

Be it known that I, WILLIAM H. BRANSCUM, a citizen of the United States, residing at Highland, in the county of San Bernardino and State of California, have invented new and useful Improvements in Attachments for Motor Vehicles, of which the following is a specification.

This invention relates to attachments for motor vehicles, the general object of the invention being to provide a combined trunk carrier, bumper and fender brace which may be attached to the rear of the vehicle.

With the above and other objects in view, the invention further includes the following novel features and details of construction, to be hereinafter more fully described, illustrated in the accompanying drawings and pointed out in the appended claims.

In the drawings:—

Figure 1 is a plan view of the chassis of a vehicle showing the invention in use.

Figure 2 is a side view of a vehicle with the invention thereon, parts being broken away.

Figure 3 is a transverse sectional view through one of the beams and showing its connection with the vehicle.

Figure 4:
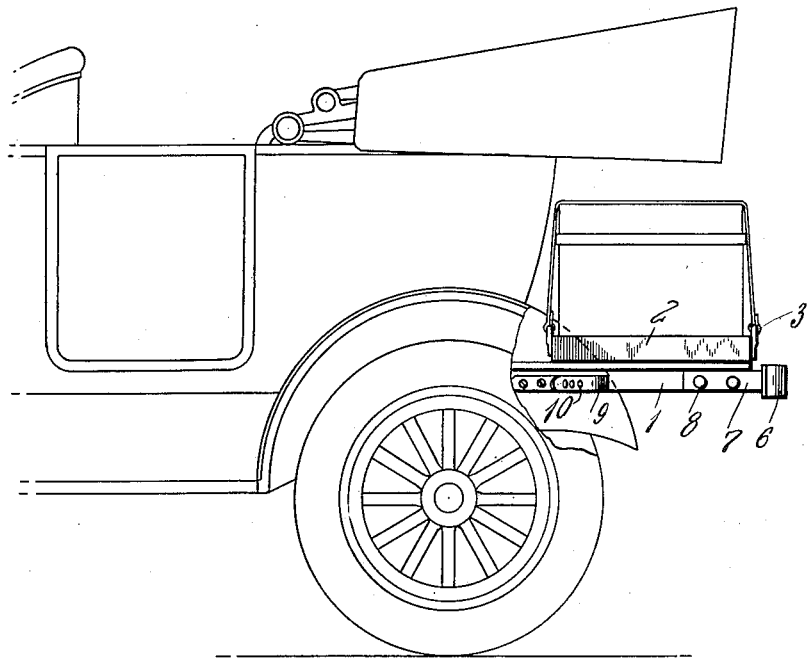
Figure 4 is a transverse sectional view through Figure 1.
Figure 5:
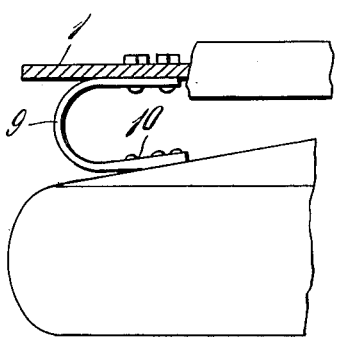
Figure 5 is a detail plan view with parts in section.
Figure 6:
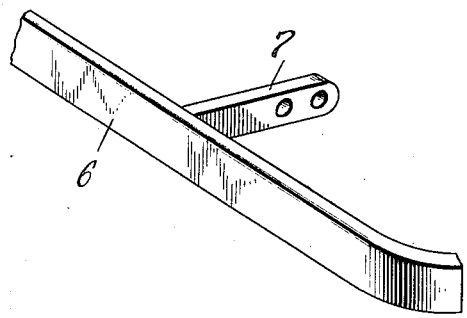
Figure 6 is a partial view of the bumper.

As shown in these views the attachment comprises a pair of T-beams 1 and a rectangular-shaped frame 2 which is secured to the outer ends of the beams 1. This frame is constructed of angle bars as shown so that it forms a support for a trunk or the like, the vertical flanges of the angle bars acting to hold the trunk in the frame. Some of these bars may be provided with the loops 3 for receiving straps to strap the trunk in place. Brackets 4 are connected with the inner flanges of the T-beams and extend between the side bars of the chassis and the body and receive the bolts 5 which connect the device with the vehicle. A bumper 6 has its arms 7 bolted to the vertical flange of each T-beam at the rear thereof as shown at 8 so that this bumper can be used or not as desired. Braces 9 are bolted to the T-beams and have their outer ends fastened to the rear fenders as shown at 10 so as to brace these fenders.

From the foregoing it will be seen that I have provided simple means for supporting a trunk or other receptacle at the rear of an automobile and to which a rear bumper can be connected if desired. Such means also permits braces for the rear fenders to be used. While this attachment is mainly designed for the Ford type of automobile it will of course be understood that it may be used on other types.

The invention is susceptible of various changes in its form, proportions and minor details of construction and the right is herein reserved to make such changes as properly fall within the scope of the appended claims.

Having described the invention what is claimed is:—

1. An attachment for a motor vehicle comprising a pair of beams, means for attaching the same to the rear part of a vehicle and a trunk supporting frame supported by the beams, said frame being formed of angle irons, the vertical flanges of which are provided with strap receiving loops and said vertical flanges forming a space to receive the bottom part of a trunk.

2. At attachment for a motor vehicle comprising a pair of beams, means for attaching the same to the rear part of the vehicle, a trunk supporting frame connected with the rear ends of the beams, a bumper having its arms detachably connected with the rear ends of the beams and fender braces bolted to the beams and to the fenders.

In testimony whereof I affix my signature.

WILLIAM HERMON BRANSCUM.